United States Patent Office 2,908,635
Patented Oct. 13, 1959

2,908,635

METHOD OF MAKING CO-PRECIPITATED SILICA-ALUMINA CATALYST

Henry J. Ogorzaly, Summit, N.J., assignor to Esso Research and Engineering Company, a corporation of Delaware No Drawing. Application August 24, 1953
Serial No. 376,273

2 Claims. (Cl. 208—120)

This invention relates to a method of making a catalyst and more particularly relates to a method of making an improved alumina-silica hydrocarbon conversion catalyst containing a high proportion of alumina.

It is known to manufacture satisfactory cracking catalysts containing about 12-13% alumina, the remainder consisting of silica. Such catalysts have been widely used for the catalytic cracking of hydrocarbons in commercial plants. Various methods for making such catalysts are known. It has been found that silica-alumina catalysts having higher alumina contents than above noted are more resistant to deactivation by heat and particularly steam and more resistant to contamination by metal oxides of high dehydrogenating power, such as iron, vanadium, and nickel, than are catalysts containing 12-13% alumina.

Attempts to prepare a satisfactory silica-alumina catalyst of high alumina content (between about 20 and 50% by weight) by modification of known commercial methods have not been successful. It is well known that free alumina catalyzes some hydrocarbon conversion reactions, and a common failing of high alumina content siliceous cracking catalyst has been that it exhibits an increased tendency to form gas and carbon in preference to the desired gasoline fraction. Also, failure to carry out the preparations under the best conditions results in a catalyst which exhibits lower stability toward deactivation, particularly in the presence of steam, than is known to be possible. It is well known that the preparation of a good alumina-silica cracking catalyst requires some form of chemical combination between the two principal components, and the unsatisfactory characteristics of many high alumina content catalysts may result from a failure to achieve the desired reaction between the silica and the alumina.

Silica-alumina catalysts are produced both in batch-type and continuous operations. In many respects the continuous type of operation is preferred. In one such process, sodium silicate and acid are mixed to form a quick-setting slightly basic silica hydrosol containing about 3 to 6% by weight of $SiO_2$ which is allowed to set with agitation to form a water-slurry of gel particles. The gel slurry is then adjusted to a neutral pH of 7, acid alum solution is then added, and the alumina is caused to precipitate and react with the siliceous gel by the addition of a base such as ammonia. Using this procedure it has not been possible to prepare a satisfactory silica-alumina catalyst of high alumina content. Apparently the silica hydrogel or hydrated silica particles prepared by this process are not capable of reacting effectively with the aluminum salt in excess of about 20% of alumina by weight on the silica as dry $SiO_2$. This may be due to an undesirable degree of polymerization of the silica hydrogel, before it is given an opportunity to react with the alumina.

According to the present invention the slurry process above referred to is modified in a manner to maintain the hydrogen ion concentration of the liquid medium continuously in the acid range and to control the nature or the extent of growth of the silica polymer before the addition of the aluminum sulfate and ammonia solutions.

More specifically, according to the preferred form of the present invention the sodium silicate solution and sulfuric acid are mixed in such ratio as to produce a slightly acid silica hydrosol of extended set time. Aluminum sulfate solution (containing free acid) is added to the silica hydrosol before setting occurs. Ammonia solution is then added with agitation to form a neutral water slurry of gel particles and to react the alumina with the hydrated silica. Catalyst of good quality can also be produced if the acid silica hydrosol is allowed to gel with agitation to form a water slurry before the addition of the alum solution and then ammonia is added to bring the slurry to about neutral.

The important feature of the present invention is believed to be the reaction of the alumina with hydrated silica which has experienced slight aging under continuously acid conditions. It may be that the degree or nature of the polymerization of the silica is thereby affected in such a way that there is increased opportunity for combination of the alumina with the silica.

Referring now more specifically to the present process, sodium silicate solution having a concentration between about 3 and 6% by weight of $SiO_2$ is mixed with sulfuric acid solution having a concentration of about 40% by weight $H_2SO_4$. Instead of sulfuric acid, other inorganic acids such as hydrochloric acid, nitric acid, etc., may be used. Instead of sodium silicate solutions, potassium silicate solutions may be used.

As a result of mixing the sulfuric acid and the sodium silicate solutions, a silica hydrosol having a pH of about 3.5 to 5.5 is formed. The gelling time of silica hydrosol varies in response to many conditions, such as pH, temperature, concentration of $SiO_2$ and of electrolytes, etc.; silica hydrosols prepared as described above have set times in the range of about 10 minutes to 180 minutes or more at approximately room temperature, depending principally on the pH level. During the period preceding gelation, slow polymerization of the hydrated silica molecules takes place; and the proportion of the time required for gelation or setting to occur which has passed, may be taken as a rough index of the amount of polymerization which has occurred. That is, if the gelling time is 100 minutes and 50 minutes have passed, this is roughly an indication that 50% of the polymerization has occurred.

Preferably prior to the time at which the hydrated silica sol would set if polymerization were allowed to proceed, an aqueous aluminum sulfate solution containing about 20 to 25% by weight of $Al_2(SO_4)_3$, is mixed with the silica hydrosol mixture. This alum solution generally contains 1 to 4% free sulfuric acid. The increased acidity of the mixture is believed effectively to stop or greatly slow down further polymerization of the silica hydrosol.

An aqueous ammonia solution containing about 28% by weight of $NH_3$ is then added to the mixture of aluminum sulfate solutions and colloidal sol of hydrated silica resulting in a pH of approximately 7. At this pH level, gelation of the hydrated silica occurs rapidly and the reaction of the alumina present with the hydrated silica is carried to completion. The reacting mixture is vigorously agitated by means of a paddle stirrer to maintain the hydrogel in the form of a water suspension of gel particles.

The gel slurry is dewatered by filtration, dried, washed with an alkaline wash liquid and water, and finally dried again. It may then be ground to the desired particle size. Alternatively the gel slurry may be dewatered by filtration, reslurried in water and spray-dried, then washed with an alkaline wash liquid and water, and finally dried in a secondary drying step such as a kiln or the like.

With the above process silica-alumina catalysts containing on the order of 40% $Al_2O_3$ may be prepared, which are more steam stable and more resistant to contamination than commercial silica-alumina catalyst now in use (containing about 13% $Al_2O_3$), and which are also more steam stable and more selective in cracking than high alumina catalysts prepared by other methods. Catalysts of somewhat inferior quality can be prepared by a slight modification of the above process in which the silica hydrosol is allowed to set to a water slurry of hydrogel, before the addition of alum and ammonia, providing that slightly acid conditions are maintained continuously from the time of mixing the silicate and acid to the moment of alum addition.

*Example 1*

76.7 gallons of sodium silicate solution of about 6.2° Bé., containing 4.4 wt. percent $SiO_2$ concentration were mixed with 3.3 gallons of sulfuric acid solution containing 40% $H_2SO_4$. The sodium silicate had a weight ratio of about 1:3.25 of $Na_2O$ to $SiO_2$.

The resulting mixture had a pH of 4.6, and a gel time as measured on a withdrawn sample of about 21 minutes. The mixture was not allowed to gel; it was held at about 100° F. for 12 minutes, after which there was added to the clear sol 335 lbs. of an alum solution containing 21% of aluminum sulfate and some free sulfuric acid. The pH of the resulting mixture was about 1.2.

To this mixture was added with continuous agitation 104 pounds of an aqueous ammonia solution of 28% ammonia concentration by weight. A rapid gelation of the hydrosol resulted. A firm gel was not allowed to form, but by continuous paddle agitation the gel particles were maintained as a dispersed slurry suspended in the liquid mixture. The pH of the suspension was 7.2.

The suspension was then dewatered on a filter and dried in a steam oven at 270° F. The dried gel was then ground to pass through a 20 mesh screen. A portion was slurried in water, filtered and the filtered cake washed on the filter first with 3 gallons of water, then 1 gallon of a 1% $NH_3$ solution, and then 4 gallons of water per pound of dry catalyst. Another portion was slurried, filtered and the filter cake washed with 2 gallons each of first water, then 2% $Na_2CO_3$ solution, then 2% $(NH_4)_2SO_4$ solutions, and finally water, per pound of dry catalyst. The two portions were then given a final drying in a steam oven.

The following inspections were obtained on the catalyst prepared according to the above example.

| Type of Wash | $NH_3$ Solution | $Na_2CO_3+$ $(NH_4)_2 SO_4$ Solutions |
|---|---|---|
| Chemical Analysis (Volatile-Free Basis): | | |
| Percent $Al_2O_3$ | 38.7 | 39.4 |
| Percent $SO_4$ | 0.19 | 0.54 |
| Percent $Na_2O$ | 0.046 | 0.045 |
| Percent Volatile @ 1,700° F | 28.3 | 16.1 |

The two products were then pilled and tested for catalyst cracking activity and selectivity after exposure to severe steaming conditions (24 hours at 1050° F. under 60 p.s.i.g. steam pressure). The same steaming treatment was given a commercial 13% alumina catalyst. The cracking test was carried out on 3/16" pills under fixed bed conditions using a space rate of 0.6 liquid volume of oil per hour per volume of catalyst at 850° F. for a 2 hour process period. The feed stock was a light East Texas gas oil of 500–700° F. boiling range and 33.5° API gravity. The following results were obtained:

| Catalyst | Prepared according to the example given | | Commercial 13% $Al_2O_3$ Catalyst $Al_2O_3$ Catalyst |
|---|---|---|---|
| Catalyst | | | |
| Type of wash | $NH_3$ solution. | $Na_2CO_3+$ $(NH_4)_2$ $SO_4$ solutions. | |
| Liquid product boiling below 400° F., Vol. Percent. | 40.5 | 38.5 | 26 |
| Gas Producing Factor | 1.20 | 1.19 | 1.0 |
| Carbon Producing Factor | 1.04 | 1.09 | 1.0 |

From this comparison it may be seen that the catalysts of the example were very much more resistant to the deactivating effect of the steam treatment than ordinary commercial catalyst, as evidenced by the much higher conversion of gas oil to naphtha at the same test conditions. The gas and carbon producing factors are indices of the selectivity of the cracking reaction and represent the ratio of the weight of gas or carbon formed by the test catalyst at a given conversion to that formed by a standard reference catalyst at the same conversion level. The catalysts of the example were slightly less selective for naphtha production than commercial 13% $Al_2O_3$ catalyst as shown by the higher gas and carbon producing factors; but they are considerably better in this respect than other high alumina-content catalysts.

*Example 2*

In another example the pH of the silica hydrosol prepared by mixing sodium silicate and sulfuric acid was 3.95 and the silica hydrosol had a set time of about 120 minutes; aqueous aluminum sulfate containing free acid was added to the silica hydrosol after 10.5 minutes. Ammonia solution was then added with continuous agitation bringing the mixture to a pH of 7.2 and fixing the alumina on the silica base. The catalyst finished by ammonia washing contained 42.2 percent by weight $Al_2O_3$ and in the standard cracking test after steaming yielded a liquid product of which 40.0 vol. percent boiled below 400° F.

*Example 3*

In another example, the pH of the silica hydrosol prepared by mixing sodium silicate and sulfuric acid was 5.5. The hydrosol had a set time of 10 minutes. It was allowed to gel with continuous stirring, forming a slurry of gel particles in water. Acid alum solution was added 25.5 minutes after mixing the sodium silicate and acid, and ammonia was then added with continuous agitation, bringing the pH of the mixture to 7.2. After finishing with ammonia washing, the catalyst contained 39.1% $Al_2O_3$ and in the standard cracking test yielded a liquid product of which 37.5% boiled below 400° F. The gas and carbon producing factors were 1.45 and 1.18 respectively.

The following example shows the importance of maintaining the pH substantially at the neutral point after addition of the ammonia solution.

*Example 4*

In this example, a silica hydrosol of 3.85 pH was prepared. The set time was 110 minutes. Acid alum solution was added at a hydrosol age of 10.5 minutes, i.e. substantially before gelation. Ammonia solution was then added with agitation to induce gelation and fix the alumina on the silica base. The quantity of ammonia was increased in this test so that a final pH of 8.5 was attained. The catalyst was then finished with ammonia washing as previously described; it contained 43.8 ($Al_2O_3$) but in the standard cracking test after steaming, the liquid product showed only 33 volume percent of material boiling below 400° F. It is believed that raising the pH to 8.5 on adding the ammonia solution gave a poorer catalyst.

In all of these studies, it has been found that improved effectiveness of the $Al_2O_3$, as shown by higher catalyst activity in the cracking test after steaming also resulted in lower gas and carbon producing factors, i.e. in better selectivity to naphtha formation. Optimum results were obtained when adding alum solution to the acid hydrosol before setting occurred, and subsequently inducing gelation and alumina deposition at a pH level of about 7, produced by the addition of ammonia. It is within the contemplation of the invention to add the aluminum sulfate solution to the silica hydrosol at the time of gelation of the hydrosol.

The preferred method for commercial application of the process consists of mixing the various reagent streams in mixing nozzles while pumping continuously between holding tanks equipped with paddle stirrers. Thus in step 1 a continuous stream of dilute sodium silicate is mixed with acid in a nozzle and the resulting acid hydrosol is discharged into an agitated tank. The acid hydrosol or gel slurry is continuously pumped from the first tank through a mixing nozzle in which acid alum solution is added, and discharged into a second agitated tank. From the second tank the acid solution or suspension is continuously pumped through a mixing nozzle in which ammonia solution is added and the neutral slurry is discharged into a third agitated tank. From this tank the slurry is discharged continuously to the dewatering filter.

The gelling time of the silica hydrosol may be between about 10 and 180 minutes. The holding time in the first tank or vessel may vary between 10 minutes and 2 hours but preferably should be about half the setting time of the hydrosol. The pH in the first tank may be varied between about 3.5 and 5.5.

In the second tank or vessel after the addition of the aqueous aluminum sulfate containing free acid, the holding time may vary between about 10 and 30 minutes and the pH may be varied between about 1 and 3. The amount of aluminum sulfate added may be varied to give a high alumina containing silica-alumina catalyst so that the final catalyst will contain about 20 to 50% $Al_2O_3$ by weight. The amount of free acid contained in the aluminum sulfate solution varies between about 1 and 4% by weight.

In the third tank or vessel the holding time may be varied between about 10 and 120 minutes and the pH may be varied between about 6.5 and 7.5.

In general the temperature in the first tank will be slightly above room temperature, usually between 90 and 150° F. The temperature in the remaining operations will be in a similar range, and no special provision for heating or cooling will be necessary.

The concentration of the sodium silicate solution may be varied between about 3 and 6 wt. percent $SiO_2$. The sodium silicate may be of different compositions and may be one selected where the ratio of $Na_2O$ to $SiO_2$ varied from about 1 to 1, to 1 to 4. The sulfuric acid used for reacting with the sodium silicate solution may have a concentration which can be varied from about 10 to 60% by weight of $H_2SO_4$.

Aluminum salts such as aluminum nitrate, aluminum chloride, etc. may be used but the aluminum sulfate is preferred because it is cheaper.

Acid silica hydrosols prepared in other ways such as by passing a sodium silicate solution through cation exchange resin may be used in the present process.

What is claimed is:

1. A process for preparing a catalyst containing between about 20% and 50% alumina and the rest substantially silica which comprises preparing a silica hydrosol having a pH between about 3.5 and 5.5, effecting only limited polymerization of said silica hydrosol without causing gelation thereof and maintaining said silica hydrosol as a clear sol by holding it at a pH between about 3.5 and 5.5 for a period of time equal to about one-half the setting time of said silica hydrosol, then substantially reducing further polymerization of said silica hydrosol by adding an acidic aqueous solution of aluminum sulfate thereto to reduce the pH of the resulting solution to between about 1.0 and 3.0, then adding to said solution an aqueous ammonia solution while agitating the resulting solution to raise the pH thereof to about 7.0 to effect formation of hydrogel particles from the polymerized silica hydrosol and precipitation of alumina and combination of the alumina and silica while continuing the agitation to form an aqueous slurry of hydrogel particles of silica-alumina composite, dewatering the slurry to recover silica-alumina composite particles and drying, washing and redrying said recovered silica-alumina composite particles to produce silica-alumina catalyst.

2. A process for converting higher boiling hydrocarbons to gasoline hydrocarbons which comprises contacting a higher boiling hydrocarbon oil under conversion conditions of temperature and pressure to effect the desired extent of conversion with a silica alumina catalyst containing between about 20% and 50% alumina and the rest substantially silica prepared by forming a silica hydrosol having a pH between about 3.5 and 5.5, effecting only limited polymerization of said silica hydrosol without causing gelation thereof and maintaining said silica hydrosol as a clear sol by holding it at a pH between about 3.5 and 5.5 for a period of time equal to about one-half the setting time of said silica hydrosol, then substantially reducing further polymerization of said silica hydrosol by adding an acidic aqueous solution of aluminum sulfate thereto to reduce the pH of the resulting solution to between about 1.0 and 3.0 and then adding to said solution an aqueous ammonia solution while agitating the resulting solution to raise the pH thereof to about 7.0 to effect formation of hydrogel particles from the polymerized silica hydrosol and precipitation of alumina and combination of the alumina and silica while continuing the agitation to form an aqueous slurry of hydrogel particles of silica-alumina composite, dewatering the slurry to recover silica-alumina composite particles and drying, washing and redrying said recovered silica-alumina composite particles to produce said silica-alumina catalyst.

References Cited in the file of this patent

UNITED STATES PATENTS

| | | |
|---|---|---|
| 2,317,803 | Reeves et al. | Apr. 27, 1943 |
| 2,356,576 | Free et al. | Aug. 22, 1944 |
| 2,483,782 | Pierce | Oct. 4, 1949 |
| 2,595,339 | Den Herder et al. | May 6, 1952 |
| 2,684,340 | Baral et al. | July 20, 1954 |
| 2,701,793 | Ashley | Feb. 8, 1955 |